(12) United States Patent  
Kang et al.

(10) Patent No.: US 7,840,200 B2
(45) Date of Patent: Nov. 23, 2010

(54) ANTENNA MATCHING DEVICE AND TRANSCEIVER HAVING THE SAME

(75) Inventors: Byung-Su Kang, Daejeon (KR); Jae-Ho Jung, Daejeon (KR); Seong-Min Kim, Daejeon (KR); Kwang-Chun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 640 days.

(21) Appl. No.: 11/929,863

(22) Filed: Oct. 30, 2007

(65) Prior Publication Data

US 2008/0136729 A1    Jun. 12, 2008

(30) Foreign Application Priority Data

Dec. 8, 2006    (KR) .................. 10-2006-0124498

(51) Int. Cl.
*H04B 1/18* (2006.01)
(52) U.S. Cl. .............. 455/188.1; 455/77; 455/116; 455/121; 455/114.1; 333/133; 343/860
(58) Field of Classification Search .......... 455/188.1, 455/77, 116, 121, 114.1, 127.4, 161.1, 168.1, 455/193.1; 333/133, 193; 343/860, 745

See application file for complete search history.

(56) References Cited

U.S. PATENT DOCUMENTS

| | | | | |
|---|---|---|---|---|
| 6,025,805 A * | 2/2000 | Smith et al. | .................. | 343/702 |
| 6,055,278 A * | 4/2000 | Ho et al. | ...................... | 375/296 |
| 6,134,452 A * | 10/2000 | Hufford et al. | ............ | 455/552.1 |
| 6,339,409 B1 * | 1/2002 | Warnagiris | ................... | 343/895 |
| 6,400,336 B1 * | 6/2002 | Gleener | ...................... | 343/860 |
| 6,404,390 B2 * | 6/2002 | Sheen | .................. | 343/700 MS |
| 6,697,030 B2 * | 2/2004 | Gleener | ...................... | 343/860 |
| 6,862,437 B1 * | 3/2005 | McNamara | ............... | 455/188.1 |
| 6,914,563 B2 * | 7/2005 | Chen et al. | ............ | 343/700 MS |

(Continued)

FOREIGN PATENT DOCUMENTS

KR    1020060073197 A    6/2006

*Primary Examiner*—Minh D Dao (57) ABSTRACT

The present invention relates to an antenna matching device that varies a frequency bandwidth according to mobile communication services, and to a transceiver having the same. To this end, an exemplary embodiment of the present invention provides a transceiver that varies a frequency band and a bandwidth according to required services in a mobile communication system, the transceiver including an antenna matching controller that generates a prescribed switch control signal according to a service requested by a user, an antenna variable matching unit that variably forms a matching circuit according to the switch control signal to be transmitted from the antenna matching controller and varies the frequency band and the bandwidth, an analog processing unit that processes a signal to be transmitted/received through the antenna variable matching unit, and a wideband antenna that transmits/receives a radio frequency according to the frequency band and the bandwidth set by the antenna variable matching unit. Another exemplary embodiment of the present invention provides an antenna matching device including a resistor that reduces a frequency bandwidth, an inductor that reduces a frequency passing band, a capacitor and a resistor that increase the frequency passing band, and switches that control the operations of the inductor and the capacitor. According to the present invention, unnecessary radiation power of a variable matching unit can be minimized, and maximum transmission power required according to services can be reduced. In addition, system construction costs can be reduced, and a user capacity can be increased.

14 Claims, 5 Drawing Sheets

U.S. PATENT DOCUMENTS

| | | | |
|---|---|---|---|
| 7,064,728 B1 * | 6/2006 | Lin et al. | 343/792 |
| 7,071,791 B1 * | 7/2006 | Wilson, III | 333/17.1 |
| 7,142,832 B2 * | 11/2006 | Inoue et al. | 455/129 |
| 7,440,729 B2 * | 10/2008 | Solski et al. | 455/46 |
| 7,567,210 B2 * | 7/2009 | Wu | 343/700 MS |
| 7,633,355 B2 * | 12/2009 | Matsuo | 333/32 |
| 2002/0175870 A1 * | 11/2002 | Gleener | 343/745 |
| 2006/0139228 A1 * | 6/2006 | Lin et al. | 343/792 |
| 2008/0076366 A1 * | 3/2008 | Rofougaran | 455/168.1 |
| 2008/0102760 A1 * | 5/2008 | McConnell et al. | 455/73 |
| 2010/0053007 A1 * | 3/2010 | Ni et al. | 343/745 |
| 2010/0182210 A1 * | 7/2010 | Ryou et al. | 343/722 |

* cited by examiner

ANTENNA MATCHING DEVICE AND TRANSCEIVER HAVING THE SAME

CROSS-REFERENCE TO RELATED APPLICATION

This application claims priority to and the benefit of Korean Patent Application No. 10-2006-0124498 filed in the Korean Intellectual Property Office on Dec. 8, 2006, the entire content of which is incorporated herein by reference.

BACKGROUND OF THE INVENTION (a) Field of the Invention

The present invention relates to an antenna matching device that varies a frequency bandwidth according to mobile communication services, and to a transceiver having the same. In particular, the present invention relates to an antenna matching device that adaptively copes with a service having different frequency and bandwidth in a base station or a mobile terminal, and to a transceiver having the same.

This work was supported by the IT R&D program of MIC/IITA[2005-S-404-12, Research & Development of Radio Transmission Technology for 3G evolution].

(b) Description of the Related Art

Usually, a mobile communication service system has a configuration that transmits a signal to a wireless space using a single transmitting antenna terminal, which is matched according to a frequency band authorized by a competent authority, then receives the transmitted signal using a receiving antenna terminal matched with the same frequency band, and subsequently restores the signal.

Figure 1:
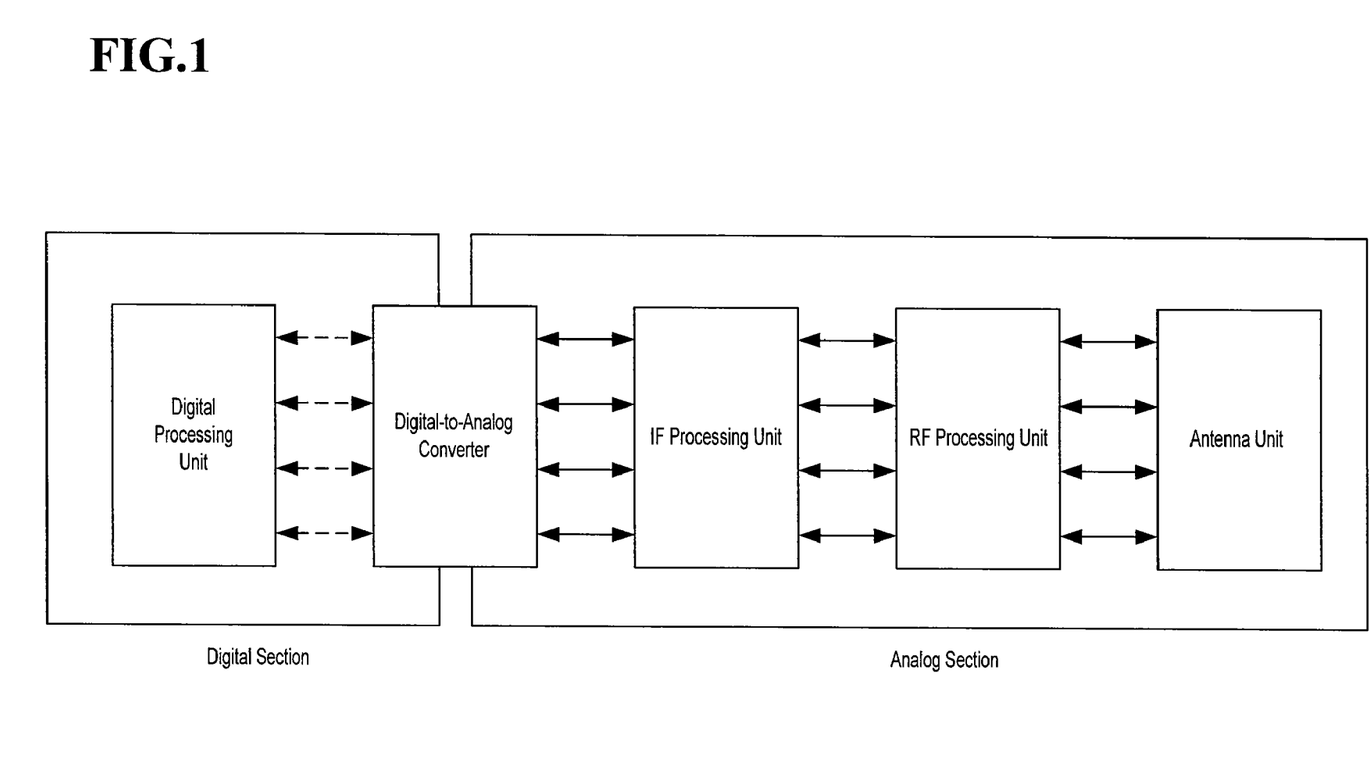
FIG. 1 is a block diagram schematically showing the internal configuration of a known transceiver.

FIG. 1 is a block diagram schematically showing the internal configuration of a known transceiver.

A known transceiver is classified into a digital section that processes a baseband digital signal satisfying a wireless communication standard, and an analog section including a digital-to-analog converter and an intermediate frequency (hereinafter, referred to as "IF") processing unit for mutual conversion between a digital signal and an analog signal, a radio frequency (hereinafter, referred to as "RF") processing unit, and an antenna unit.

A transmitter generates a digital signal using a digital processing unit in the digital section. The generated digital signal is converted into an analog signal by the digital-to-analog converter and then the converted analog signal is sent to the analog section. In the analog section, the transmitted analog signal is converted into an RF signal for wireless transmission/reception by the IF processing unit and the RF processing unit, and the converted RF signal is sent to a mobile communication network through the antenna unit.

A receiver receives the RF signal from the mobile communication network through the antenna unit. Then, the RF signal received through the RF processing unit and the IF processing unit is processed with an intermediate frequency, and is then converted into a digital signal by a digital-to-analog converter. Thereafter, the converted digital signal is processed by the digital processing unit, such that a service is provided.

The known transceiver having the above-described configuration is optimized with respect to narrowband signals, such as sound or simple data communication.

However, in the third-generation mobile communication system or later that supports high-speed data communication, there is a need for a technology that can simultaneously transmit/receive wideband signals, such as multimedia, in addition to narrowband signals, such as sound and low-capacity data. Accordingly, there is a need for a method that maximizes frequency use efficiency for transmission/reception of wideband signals.

In particular, a frequency band of 1 to 2 GHz or less than 5 GHz at maximum is used and is ready to be used in an existing wireless voice service and wireless communication services, such as a HSDPA service using latest WCDMA technology, a WiMAX service based on OFDM technology, a wireless Internet and wireless LAN service, and the like. Accordingly, there is a need for technologies and devices that efficiently use limited frequency resources.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an antenna matching device and a transceiver having the same, having advantages of optimizing frequency bands and bandwidths such that wideband and narrowband services are provided using the same band.

An exemplary embodiment of the present invention provides a transceiver that varies a frequency band and a bandwidth according to required services in a mobile communication system, the transceiver including an antenna matching controller that generates a prescribed switch control signal according to a service requested by a user, an antenna variable matching unit that variably forms a matching circuit according to the switch control signal to be sent from the antenna matching controller and varies the frequency band and the bandwidth, an analog processing unit that processes a signal to be transmitted/received through the antenna variable matching unit, and a wideband antenna that transmits/receives a radio frequency according to the frequency band and the bandwidth set by the antenna variable matching unit.

Another exemplary embodiment of the present invention provides an antenna matching device that variably forms a matching circuit according to required services in a mobile communication system and varies a frequency band and a bandwidth, the antenna matching device including a resistor that reduces a bandwidth of a frequency, an inductor that reduces a frequency passing band, a capacitor that increases the frequency passing band, and first switches that are connected to the resistor, the inductor, and the capacitor in series and control whether or not to operate the resistor, the inductor, and the capacitor, respectively.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises", "comprising", "includes", and "including", when used herein, specify the presence of constituent elements, but do not preclude the presence or addition of other constituent elements.

The term "module" used herein means a single unit that processes a specified function or operation. The module may be implemented by hardware, software, or a combination of hardware and software.

Figure 2:
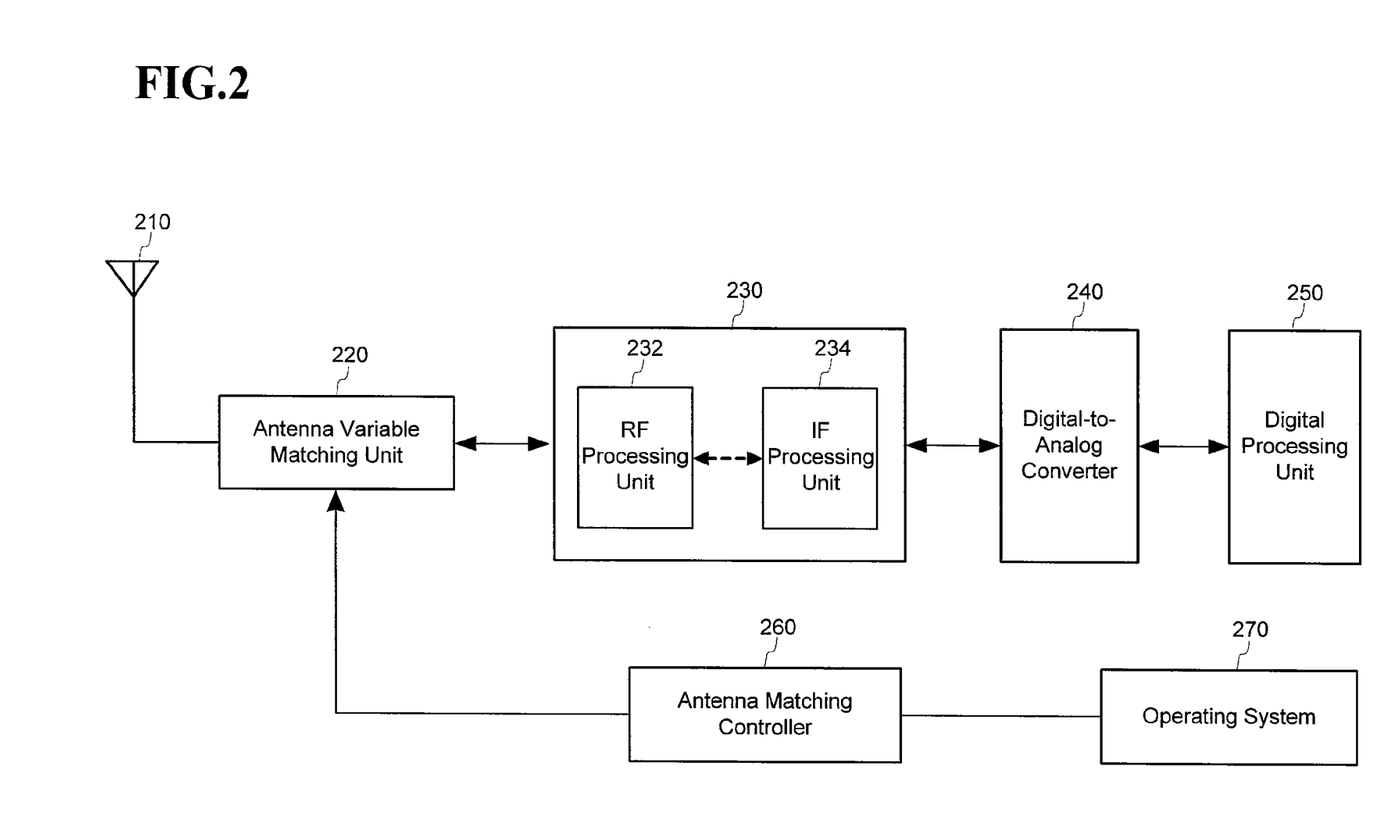
FIG. 2 is a block diagram schematically showing the internal configuration of a transceiver, which provides mobile communication services having various bandwidths, according to an exemplary embodiment of the present invention.

FIG. 2 is a block diagram schematically showing the internal configuration of a transceiver, which provides mobile communication services having various bandwidths, according to an exemplary embodiment of the present invention.

The transceiver according to the exemplary embodiment of the present invention includes a wideband antenna 210, an antenna variable matching unit 220, an analog processing unit 230, a digital-to-analog converter 240, a digital processing unit 250, an antenna matching controller 260, and an operating system 270.

The wideband antenna 210 is an antenna that can cover the entire frequency band to be allocated with respect to a single service provider or a wireless communication standard. The wideband antenna 210 transmits a signal processed by the antenna variable matching unit 220 to a mobile communication network or receives a signal to be sent from the mobile communication network. The wideband antenna 210 may be implemented as various types, such as a planar type using a microstrip, and a helical antenna using a coil.

The antenna variable matching unit 220 is activated (On) or inactivated (Off) according to a control signal from the antenna matching controller 260, and performs matching with a frequency band such that a frequency band and a bandwidth are optimized with respect to the transmitted/received signal, thereby minimizing unnecessary radiation power. As the unnecessary radiation power is minimized, maximum transmission power required for a mobile communication service is reduced. Here, the internal configuration of the antenna variable matching unit 220 according to the exemplary embodiment of the present invention will be described in detail with reference to FIGS. 3 and 4.

The analog processing unit 230 includes an RF processing unit 232 and an IF processing unit 234. The analog processing unit 230 performs an analog processing on an outgoing signal and transmits the processed signal to the antenna variable matching unit 220, or receives a received signal from the antenna variable matching unit 220 and performs an analog processing.

The RF processing unit 232 performs a radio frequency (RF) conversion for transmission of an intermediate frequency (IF) or receives the received signal from the antenna variable matching unit 220 and performs a radio frequency (RF) processing for ease of analysis.

The IF processing unit 234 converts the transmitted signal sent from the digital-to-analog converter (D/A converter) 240 or the received signal sent through the RF processing unit 232 into a prescribed intermediate frequency (IF) for ease of frequency amplification and selection. At this time, the intermediate frequency (IF) band is set to be lower than the radio frequency (RF) band.

The digital-to-analog converter 240 converts the digital signal to be transmitted/received between the analog processing unit 230 and the digital processing unit 250 into an analog signal, or converts the analog signal to a digital signal.

The digital processing unit 250 generates a signal to be transmitted or processes the received signal using the digital signal for data transmission/reception between various internal circuits in the transceiver.

The antenna matching controller 260 generates the switch control signal for controlling a plurality of switches in the antenna variable matching unit 220 according to the frequency band and the bandwidth requested by the operating system 270. At this time, the antenna variable matching unit 220 may use analog control switches or digital control switches. When the antenna variable matching unit 220 uses the analog control switches, the antenna matching controller 260 needs a digital-to-analog conversion module or an analog voltage generation module that generates an analog voltage as the switch control signal.

The operating system 270 notifies the antenna matching controller 260 of the service requested by the user. If the service request is received from the user, the operating system 270 sends a frequency band and a bandwidth relative to the requested service to the antenna matching controller 260.

Figure 3:
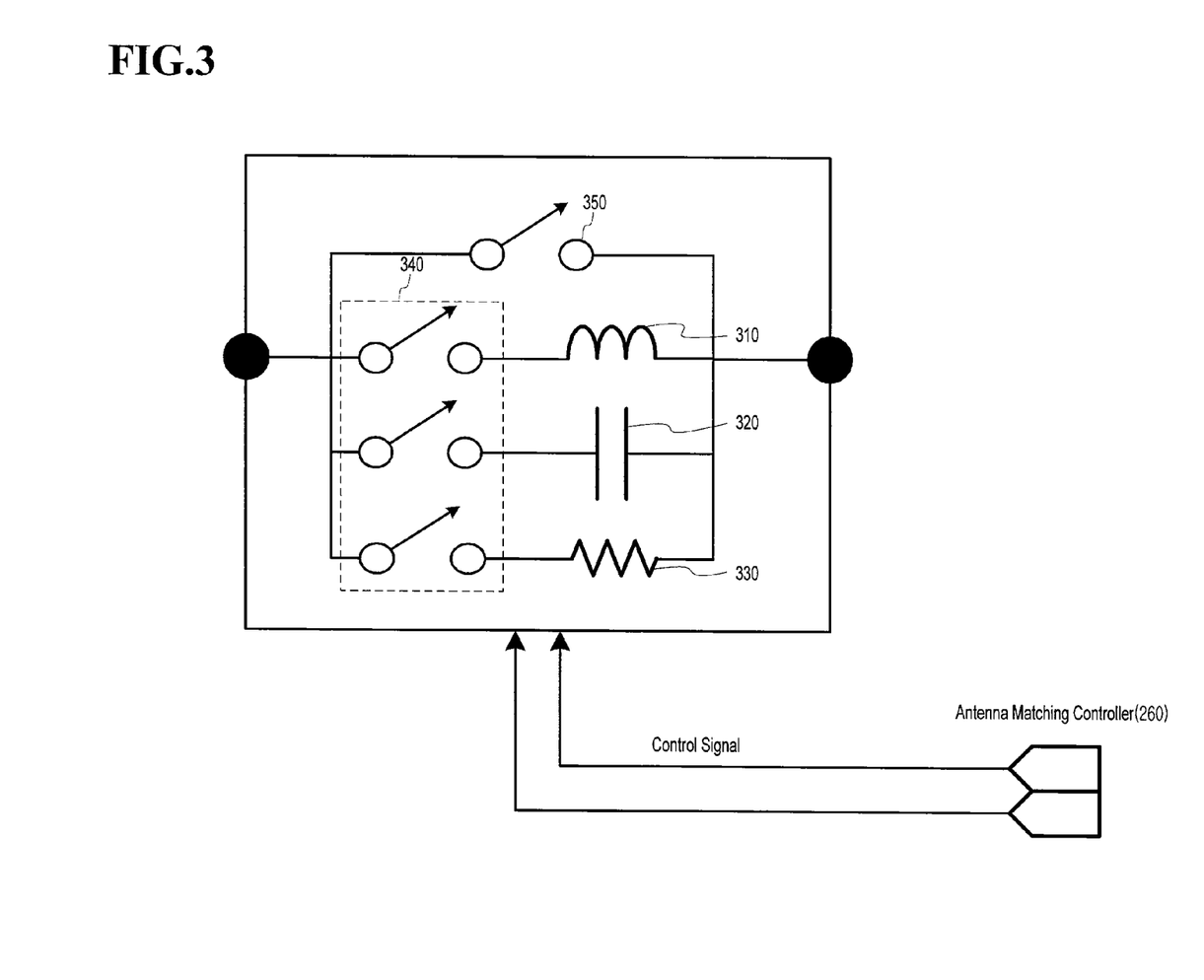
FIG. 3 is a diagram showing a basic unit structure of an antenna variable matching unit according to the exemplary embodiment of the present invention.

FIG. 3 is a drawing showing a basic unit structure of an antenna variable matching unit according to the exemplary embodiment of the present invention.

The antenna variable matching unit 220 according to the exemplary embodiment of the present invention includes a resistor 310, an inductor 320 and a capacitor 330, and a plurality of switches 340 and 350 that are equivalently connected in series and in parallel.

Here, the resistor 310 reduces a frequency bandwidth, the inductor 320 reduces a frequency passing band, and the capacitor 330 increases the frequency passing band.

The antenna variable matching unit 220 has the switches 340 respectively connected to the resistor 310, the inductor 320, and the capacitor 330 in series, and the switch 350 connected thereto in parallel. The switches 340 and 350 are activated (On) or inactivated (Off) according to the control signal to be sent from the antenna matching controller 260.

That is, the individual switches are activated or inactivated according to the control signals to be sent from the antenna matching controller 260, and then a part or all of the resistor 310, the inductor 320, and the capacitor 330 connected to the switches operate or all of them do not operate. To this end, the antenna matching controller 260 may store a table that generates the signals for activating or inactivating the individual switches in response to the user's service request input through the operating system 260.

Various frequency bands and bandwidths are generated according to the combination of the operations of the resistor 310, the inductor 320, and the capacitor 330. Accordingly, an appropriate frequency bandwidth can be allocated according to the service requested by the user. With the appropriate frequency allocation, unnecessary radiation power can be minimized.

Figure 4:
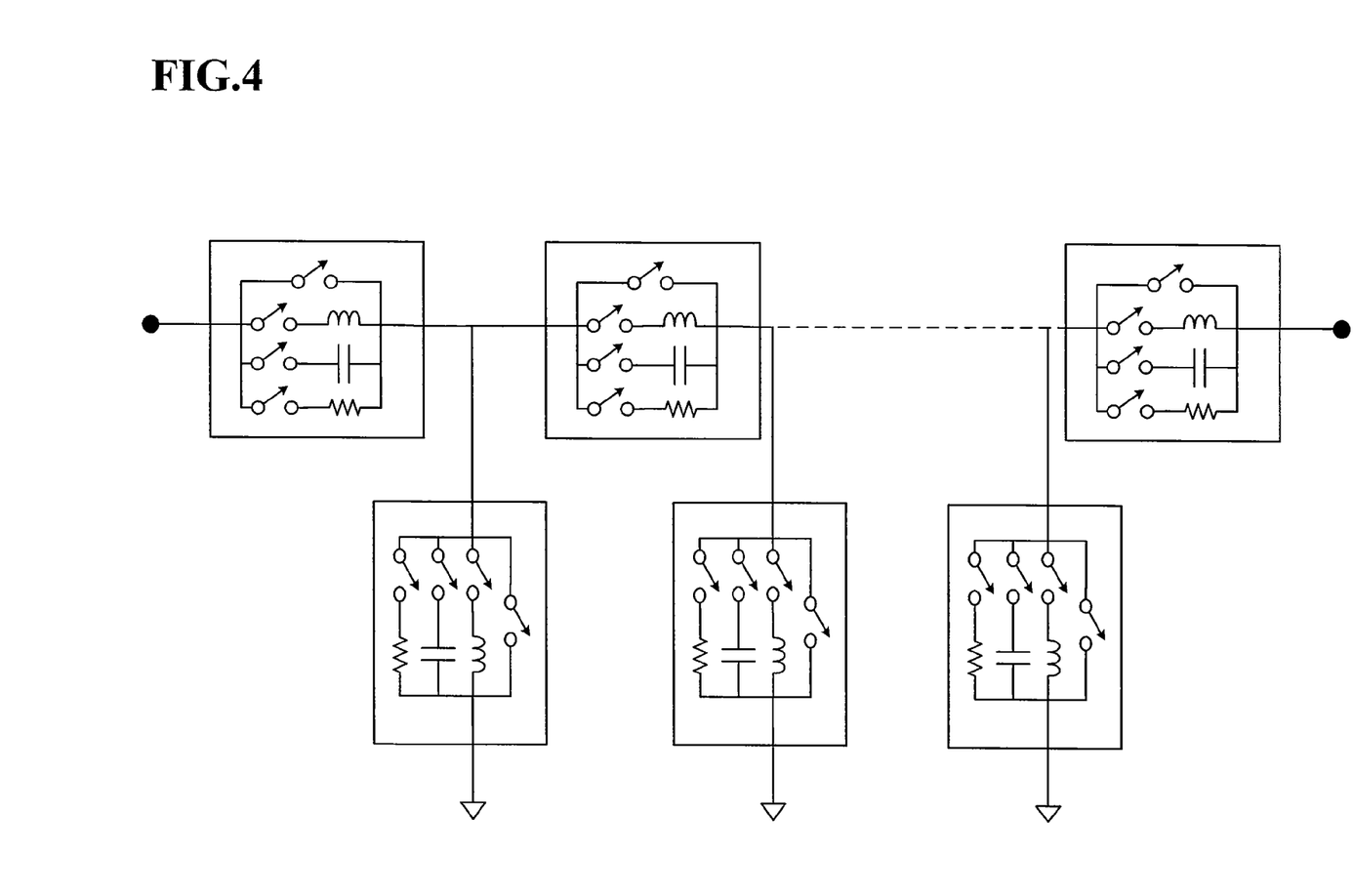
FIG. 4 is a diagram showing a case where a plurality of basic unit structures of an antenna matching unit are combined in series and in parallel according to the exemplary embodiment of the present invention.

FIG. 4 is a diagram showing a case where a plurality of basic unit structures of an antenna matching unit are combined in series and in parallel according to the exemplary embodiment of the present invention.

The antenna variable matching unit 220 may include a plurality of basic unit structures shown in FIG. 3. The basic unit structures may be combined in various ways. Here, the values of the resistors 310, the inductors 320, and the capacitors 330 in the individual basic unit structures may be the same or may be different. Further, the switches of each basic unit structure may separately operate according to the control signals to be sent from the antenna matching controller 220.

As such, if the antenna variable matching unit 220 includes the resistors 310, the inductors 320, and the capacitor 330 respectively having different values, and a plurality of circuits of the basic unit structure, in which a plurality of switches separately operate, are provided, various frequency bands and bandwidths can be generated from the antenna variable matching unit 220. At this time, various frequency bands and bandwidth to be generated are determined according to a standard or a service to be provided.

Figure 5:
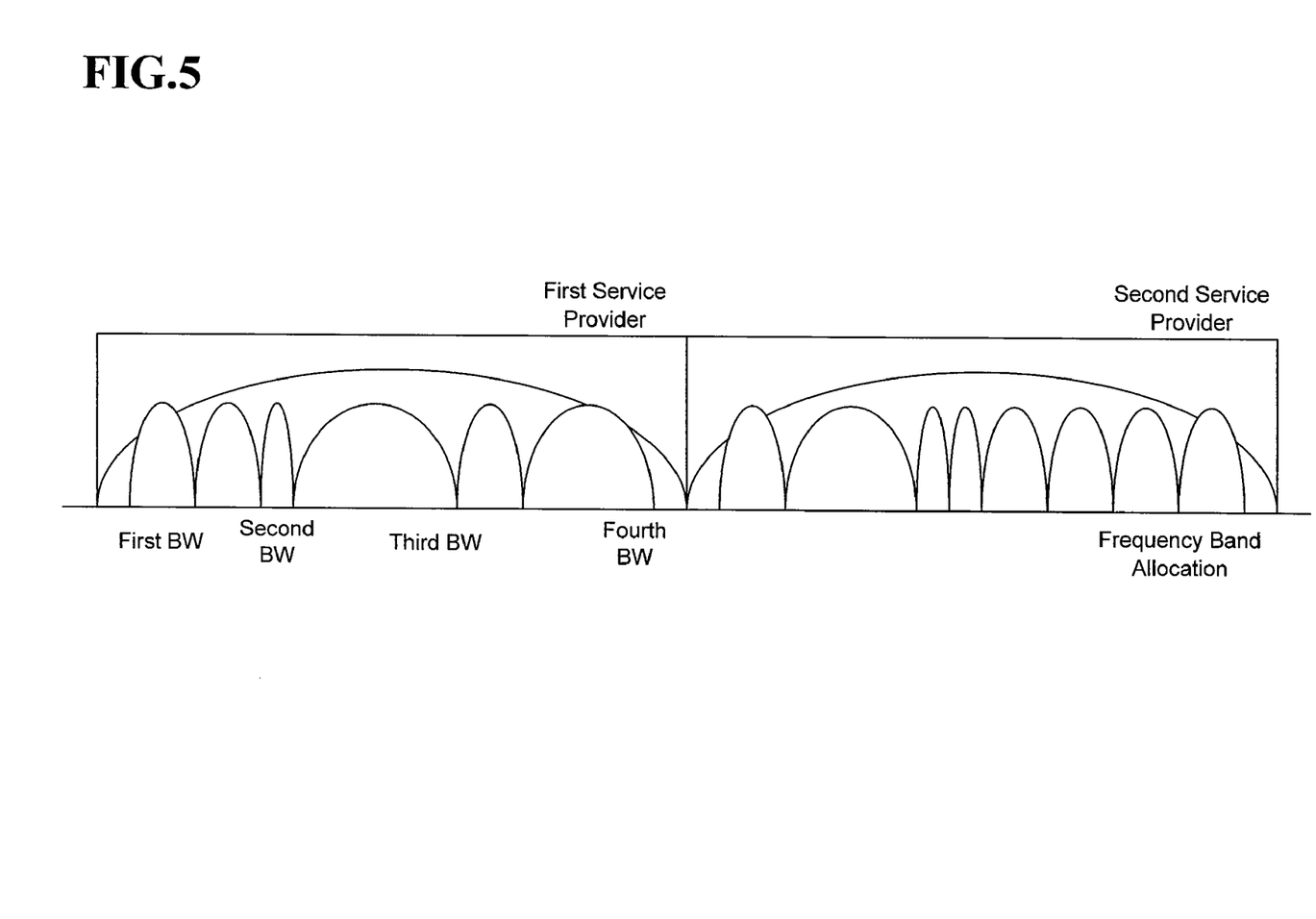
FIG. 5 is a diagram showing a frequency band, which is used by a service provider to provide a mobile communication service, according to an exemplary embodiment of the present invention.

FIG. 5 is a diagram showing a frequency band, which is used by a service provider to provide a mobile communication service, according to an exemplary embodiment of the present invention.

As shown in FIG. 5, within the entire bandwidth allocated to each service provider, when services having different bandwidths, for example, first to fourth bandwidths, are to be provided, in a Frequency Division Multiplexing Access (FDMA) system, different frequencies are allocated to the individual users.

Here, in providing the bandwidth to be requested, if the band-limited matching circuit according to the exemplary embodiment of the present invention is used, an unnecessary radiation wave to adjacent bands can be reduced, compared with the known matching antenna.

At this time, the bandwidth can vary according to the service requested by each user. However, this can be solved through matching by the switch operation in the antenna variable matching unit 220 according to the exemplary embodiment of the present invention.

That is, when one service provider is allocated with a frequency band of several MHz or tens of MHz, a maximum number of users can be accommodated in the same frequency resource, and a maximum amount of data can be transmitted/received.

The above-described exemplary embodiment of the present invention is not implemented by only the method and the apparatus, but it may be implemented by a program for executing the functions corresponding to the configuration of the exemplary embodiment of the present invention or a recording medium having recorded thereon the program. These implementations can be realized by the ordinary skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the embodiments of the present invention, when the wideband and narrowband services are provided using the same band, the antenna variable matching unit can be configured such that the frequency bandwidth and the bandwidth to be used are optimized. Accordingly, the amount of radiation out of the band can be reduced, and thus frequency use efficiency can be increased.

Further, since the variable matching unit is matched with an appropriate frequency bandwidth, unnecessary radiation power can be minimized and thus maximum transmission power required according to services can be reduced. As a result, system construction costs can be reduced, and user capacity can be increased.

What is claimed is:

1. A transceiver that varies a frequency band and a bandwidth according to required services in a mobile communication system, the transceiver comprising:
   an antenna matching controller that generates a prescribed switch control signal according to a service requested by a user;
   an antenna variable matching unit that variably forms a matching circuit according to the switch control signal to be sent from the antenna matching controller and varies the frequency band and the bandwidth;
   an analog processing unit that processes a signal to be transmitted/received through the antenna variable matching unit; and
   a wideband antenna that transmits/receives a radio frequency according to the frequency band and the bandwidth set by the antenna variable matching unit.

2. The transceiver of claim 1, wherein the antenna variable matching unit includes a resistor, an inductor, a capacitor, and a plurality of switches that variably form the matching circuit.

3. The transceiver of claim 2, wherein the antenna variable matching unit activates (On) or inactivates (Off) the plurality of switches according to the switch control signal to be sent from the antenna matching controller so as to vary the frequency band and the bandwidth.

4. The transceiver of claim 3, wherein the antenna matching controller includes a digital-to-analog conversion module or an analog voltage generation module that generates an analog voltage for switching control of the antenna variable matching unit of an analog type.

5. The transceiver of claim 3, wherein the antenna matching controller stores a generation table of the switch control signal for activating or inactivating each switch of the antenna variable matching unit according to the requested service.

6. The transceiver of claim 1, further comprising:
   an operating system that sends prescribed frequency band and bandwidth to the antenna matching controller relative to the service requested by the user.

7. The transceiver of claim 6, further comprising:
   a digital-to-analog converter that converts the analog signal processed by the analog processing unit into a digital signal; and
   a digital processing unit that performs a signal processing operation according to the digital signal converted by the digital-to-analog converter.

8. The transceiver of claim 1, wherein the analog processing unit includes:
   a radio frequency (RF) processing unit that converts a signal received through the wideband antenna into an RF frequency or converts an outgoing signal into an RF frequency band; and
   a intermediate frequency (IF) processing unit that converts the RF frequency converted by the RF processing unit into an intermediate frequency band or converts the outgoing signal into an intermediate frequency and sends the converted intermediate frequency to the RF processing unit.

9. An antenna matching device that variably forms a matching circuit according to required services in a mobile communication system and varies a frequency band and a bandwidth, the antenna matching device comprising:
   a resistor that reduces a frequency bandwidth;
   an inductor that reduces a frequency passing band;
   a capacitor that increase the frequency passing band; and
   first switches that are connected to the resistor, the inductor, and the capacitor in series and control whether or not to operate the resistor, the inductor, and the capacitor, respectively.

10. The antenna matching device of claim 9, wherein the first switch is activated or inactivated by a prescribed switch control signal according to the required services in the mobile communication system.

11. The antenna matching device of claim 9, wherein a set of the resistor and the first switch connected to the resistor, a set of the inductor and the first switch connected to the inductor, and a set of the capacitor and the first switch connected to the capacitor are connected in parallel.

12. The antenna matching device of claim 11, further comprising a second switch that is connected to the resistor, the inductor, and the capacitor in parallel, wherein the second switch is activated or inactivated by the switch control signal.

13. The antenna matching device of claim 12, wherein the switch control signal is input to both ends of the second switch, both ends of the set of the resistor and the first switch connected to the resistor, both ends of the set of the inductor and the first switch connected to the inductor, and both ends of the set of the capacitor and the first switch connected to the capacitor.

14. The antenna matching device of claim 12, wherein:
   a plurality of basic unit structures are connected in parallel or in series, and
   in each of the basic unit structures, the set of the resistor and the first switch connected to the resistor, the set of the inductor and the first switch connected to the inductor, the set of the capacitor and the first switch connected to the capacitor, and the second switch are connected in parallel.

* * * * *